US011685092B2

United States Patent
Radi et al.

(10) Patent No.: US 11,685,092 B2
(45) Date of Patent: *Jun. 27, 2023

(54) INJECTION MOLDING SYSTEMS AND METHODS

(71) Applicant: Google LLC, Mountain View, CA (US)

(72) Inventors: Babak Radi, Hsinchu (TW); Jason Evans Goulden, Los Gatos, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/662,586

(22) Filed: May 9, 2022

(65) Prior Publication Data

US 2022/0258397 A1   Aug. 18, 2022

Related U.S. Application Data

(63) Continuation of application No. 17/290,994, filed as application No. PCT/US2020/032171 on May 8, 2020, now Pat. No. 11,351,709.

(Continued)

(51) Int. Cl.
*B29C 45/73*   (2006.01)
*B29K 705/12*   (2006.01)

(52) U.S. Cl.
CPC ...... *B29C 45/73* (2013.01); *B29C 2045/7343* (2013.01); *B29K 2705/12* (2013.01)

(58) Field of Classification Search
None
See application file for complete search history.

(56) References Cited

U.S. PATENT DOCUMENTS 2,524,858 A   10/1950   Thomas
3,071,814 A   1/1963   Frederic
(Continued)

FOREIGN PATENT DOCUMENTS

CN   102741028   10/2012
CN   109563337   4/2019
(Continued)

OTHER PUBLICATIONS

"Foreign Office Action", TW Application No. 109141061, dated Jul. 9, 2021, 15 pages.

(Continued)

*Primary Examiner* — Timothy Kennedy
*Assistant Examiner* — Olukorede Esan
(74) *Attorney, Agent, or Firm* — Colby Nipper PLLC

(57) ABSTRACT

Techniques are described for injection molding. When material inside a cavity of a tool is solidified into a molded part, the tool imparts a finished surface onto the part, including sidewalls with a zero or low-draft angle. To allow separation from the cavity without using sleeves or sliders, the cavity is widened, just prior to the part being ejected. The tool is made from metal with a high coefficient of thermal expansion, so the size of the cavity can be manipulated using temperature control. Heat applied to an outer portion of the metal surrounding the cavity pulls the metal away from the part creating an air gap within the cavity. Carefully applied cooling to an inner portion of the metal blocks the heat and keeps the surface temperature under control, which preserves the finished surface on the part. When the air gap allows, the part releases from the cavity with the finished surface intact.

20 Claims, 13 Drawing Sheets

Related U.S. Application Data

(60) Provisional application No. 62/985,559, filed on Mar. 5, 2020.

(56) References Cited

U.S. PATENT DOCUMENTS

| | | | |
|---|---|---|---|
| 3,704,970 | A | 12/1972 | Reeves |
| 3,972,668 | A | 8/1976 | Cessna |
| 4,014,974 | A | 3/1977 | Cessna, Jr. |
| 4,459,092 | A | 7/1984 | Hatakeyama |
| 4,618,466 | A | 10/1986 | McGlashen et al. |
| 5,776,407 | A | 7/1998 | Takeda |
| 7,857,615 | B2 | 12/2010 | Zha |
| 8,263,211 | B2 | 9/2012 | Nishimura |
| 9,023,267 | B2 | 5/2015 | Haupt et al. |
| 9,475,225 | B2 | 10/2016 | Giraud et al. |
| 9,586,351 | B2 | 3/2017 | Haupt |
| 9,616,603 | B2 | 4/2017 | Haupt |
| 11,351,709 | B2 * | 6/2022 | Radi ................. B29C 45/73 |
| 2004/0211668 | A1 | 10/2004 | Montminy et al. |
| 2004/0227272 | A1 | 11/2004 | Saito |
| 2005/0064061 | A1 | 3/2005 | Eichlseder |
| 2010/0159183 | A1 | 6/2010 | Nishimura |
| 2010/0270052 | A1 | 10/2010 | Crohas et al. |
| 2010/0285260 | A1 | 11/2010 | Bookbinder et al. |
| 2012/0044590 | A1 | 2/2012 | Alcazar |
| 2014/0339738 | A1 | 11/2014 | Haupt et al. |
| 2015/0367545 | A1 | 12/2015 | Berg et al. |
| 2017/0173834 | A1 | 6/2017 | Haupt |
| 2019/0225798 | A1 | 7/2019 | Canovas et al. |
| 2020/0001510 | A1 | 1/2020 | Wakabayashi et al. |
| 2021/0362386 | A1 | 11/2021 | Radi |

FOREIGN PATENT DOCUMENTS

| | | |
|---|---|---|
| DE | 102013112426 | 5/2015 |
| EP | 2170575 | 3/2013 |
| JP | S6440313 | 2/1989 |
| JP | 02249616 | 10/1990 |
| JP | H0768614 | 3/1995 |
| JP | 2001260139 | 9/2001 |
| WO | 2011048365 | 4/2011 |
| WO | 2012140511 | 10/2012 |
| WO | 2021177988 | 9/2021 |

OTHER PUBLICATIONS

"Foreign Office Action", EP Application No. 20727130.5, dated Nov. 26, 2021, 5 pages.

"Foreign Office Acton", EP Application No. 20727130.5, dated Jun. 24, 2021, 6 pages.

"International Search Report and Written Opinion", Application No. PCT/US2020/032171, dated Oct. 20, 2020, 16 pages.

"Machine Translation from patentscope.wipo.int", JP Application No. 1993243753, Pub No. JP1995068614 (JPH0768614A), Mar. 14, 1995, 9 pages.

"Non-Final Office Action", U.S. Appl. No. 13/964,241, dated Jun. 13, 2016, 8 pages.

"Non-Final Office Action", U.S. Appl. No. 14/247,651, dated Sep. 7, 2016, 7 pages.

"Non-Final Office Action", U.S. Appl. No. 17/290,994, dated Oct. 26, 2021, 8 pages.

"Notice of Allowance", U.S. Appl. No. 17/290,994, dated Feb. 8, 2022, 7 pages.

"Notice of Allowance", U.S. Appl. No. 13/964,241, dated Oct. 24, 2016, 7 pages.

"Notice of Allowance", U.S. Appl. No. 14/247,651, dated Nov. 23, 2016, 7 pages.

"Notice of Allowance", U.S. Appl. No. 15/450,442, dated Dec. 28, 2018, 7 pages.

"Notice of Allowance", U.S. Appl. No. 13/964,252, dated Dec. 31, 2014, 7 pages.

"Restriction Requirement", U.S. Appl. No. 13/964,241, dated Jan. 11, 2016, 6 pages.

"Restriction Requirement", U.S. Appl. No. 14/247,651, dated Jun. 30, 2016, 6 pages.

"Restriction Requirement", U.S. Appl. No. 15/450,442, dated Sep. 19, 2018, 6 pages.

"TECH, Mold Building", Retrieved at: http://www.ttmp.com/tooling.html—downloaded on Jun. 12, 2013, 1 page.

"International Preliminary Report on Patentability", Application No. PCT/US2020/032171, dated Sep. 6, 2022, 10 pages.

"Partial European Search Report", EP Application No. 22189565.9, dated Nov. 10, 2022, 13 pages.

"Extended European Search Report", EP Application No. 22189565.9, dated Feb. 10, 2023, 12 pages.

* cited by examiner

INJECTION MOLDING SYSTEMS AND METHODS

INCORPORATION BY REFERENCE

This application is a continuation application of U.S. application Ser. No. 17/290,994, filed May 3, 2021, which is a 371 of international PCT Application Serial No. PCT/US2020/032171, filed May 8, 2020, which claims priority to U.S. Application Ser. No. 62/985,559, filed Mar. 5, 2020, the disclosures of which are incorporated herein by reference.

BACKGROUND

Parts manufactured through injection molding often have drafted sidewalls that are angled inward a few degrees from ninety, which enables separation from a cavity of an injection molding tool at the end of the injection molding process. As an alternative to drafted sidewalls, sleeves or sliders can be used to free the molded part from the cavity. Either approach typically requires a finishing step (e.g., sanding, sandblasting, polishing, machining, painting, etching) to give the part a finished surface with crisp edges, smooth corners, and sidewalls with a zero or low-draft angle. Having to finish each part at the end of an injection molding process may increase manufacturing time, decrease yield, and increase cost.

SUMMARY

Techniques and systems are described for injection molding, without performing finishing steps after the part is formed. When material inside a cavity of an injection molding tool is solidified into a molded part, the cavity imparts a finished surface or texture onto the molded part, including crisp edges, smooth corners, and sidewalls with a zero or low-draft angle. To allow the molded part to separate from the cavity with the finished surface intact and without using sleeves, sliders, or other special attachments, the injection molding tool undergoes thermal expansion to enlarge the cavity. The injection molding tool is made from metal, such as stainless steel. Every metal has a particular coefficient of thermal expansion. A high coefficient of thermal expansion indicates a greater amount of displacement (e.g., volume, length) per unit of temperature. By using an injection molding tool made from a metal alloy with a high coefficient of thermal expansion, the size and shape of the cavity can be manipulated using temperature control.

An outer portion of the injection molding tool is quickly heated while an inner portion between the outer portion and the cavity is simultaneously cooled. The heat applied to the outer portion of the metal surrounding the cavity just prior to ejection causes thermal expansion in the tool. The thermal expansion enlarges the cavity, pulling it away from the sidewalls of the molded part, thereby producing an air gap between the cavity and the sidewalls, which are of a zero or low-draft angle. Controlled cooling of the inner portion while heating the outer portion regulates the temperature of the inner portion and the molded part. Keeping the solidified sidewalls of the molded part cool by cooling the inner portion of the tool, preserves the finished surface applied by the cavity earlier during the molding process. The molded part is ejected from the cavity when the air gap is of sufficient size to allow the molded part to release from the cavity. In this way, the molded part can release with a finished surface and sides with a zero or low-draft angle, without requiring any additional finishing steps. Manufacturing injection molded parts without a need for finishing steps shortens manufacturing time, increases yield, or reduces cost.

In some aspects a method is described including injecting a cavity of an injection molding tool with material while the injection molding tool is at a first temperature effective to solidify the material into a molded part with a wall having a finished surface and a zero or low-draft angle. The method further includes heating an outer portion of the injection molding tool to a second temperature while cooling an inner portion of the injection molding tool that is between the cavity and the outer portion of the injection molding tool to keep the finished surface of the molded part at or below the second temperature when the air gap is formed. The method further includes ejecting, from the cavity, the molded part.

This document also describes computer-readable media having instructions for performing the above-summarized method. Other methods are set forth herein, as well as systems and means for performing the above-summarized and other methods.

This summary is provided to introduce simplified concepts about achieving a finished surface through injection molding, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of achieving a finished surface through injection molding are described in this document with reference to the following drawings. The same numbers are used throughout the drawings to reference like features and components:

FIG. 5-1 illustrates an exterior side view of the tool shown in FIG. 2.

FIG. 5-2 illustrates a bottom view of the tool shown in FIG. 2.

FIG. 5-3 illustrates a cross-sectional side view of the tool shown in FIG. 2.

FIG. 5-4 illustrates a cross-sectional bottom view of the tool shown in FIG. 2.

FIG. 6-1 illustrates a cross-sectional side-view of another tool configured to create a part through injection molding.

FIG. 6-2 illustrates a bottom view of the other tool shown in FIG. 6-1.

FIG. 7-1 illustrates a cross-sectional side view of an additional tool configured to create a part through injection molding.

FIG. 7-2 illustrates a bottom view of the additional tool shown in FIG. 7-1.

DETAILED DESCRIPTION

The techniques and systems described herein relate to one or more aspects of creating parts through injection molding.

When material inside a cavity of a tool is solidified into a molded part, the tool imparts a finished surface onto the part, including undrafted sidewalls, which by definition have a zero or low-draft angle that is close to zero degrees from ninety. To allow separation from the cavity without using sleeves or sliders, the cavity is widened, just prior to the part being ejected. The tool is made from metal with a high coefficient of thermal expansion, so the size of the cavity can be manipulated using temperature control. Heat applied to an outer portion of the metal surrounding the cavity pulls the metal away from the part, creating an air gap within the cavity. Carefully applied cooling to an inner portion of the metal regulates the temperature of the cavity, which preserves the finished surface on the molded part. When the air gap allows, the part releases from the cavity with the finished surface intact. In this way, the molded part has a finished surface including sides with a zero or low-draft angle upon ejection from the tool, without requiring any additional finishing steps. Manufacturing injection molded parts without a need for a finishing step may, alone or in combination, decrease manufacturing time, increase yield, or decrease cost.

Figure 1:
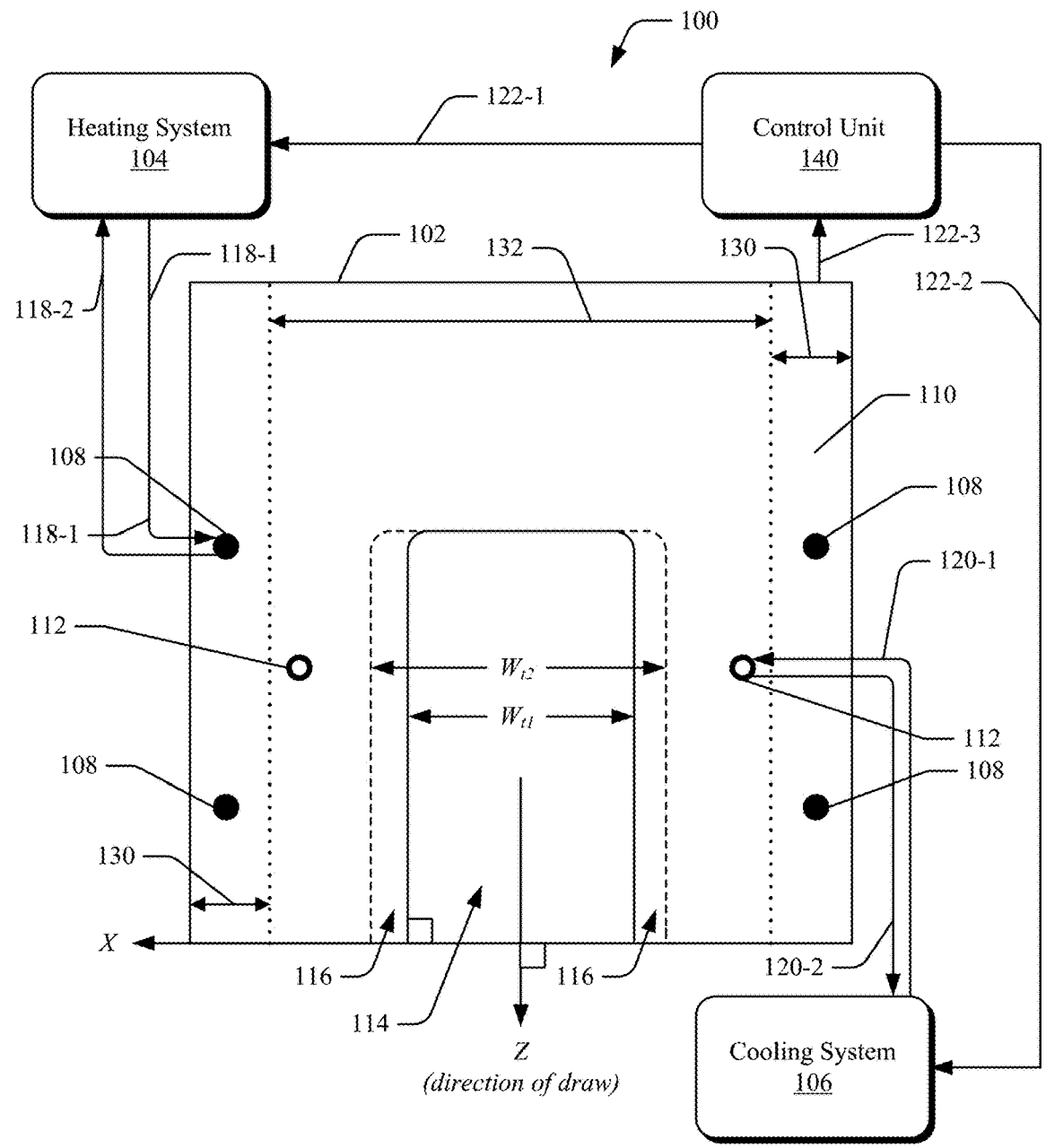
FIG. 1 illustrates an example system configured to create a part through injection molding, including an isometric view and a bottom view of a tool.
Figure 1:
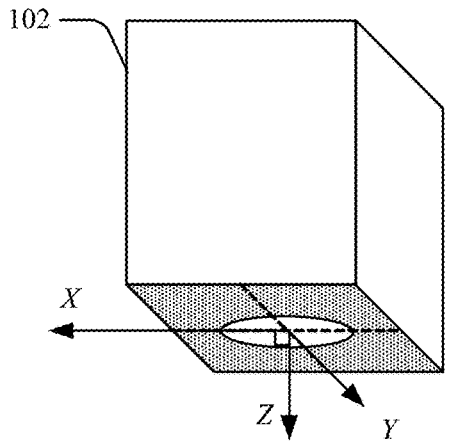
Figure 1:
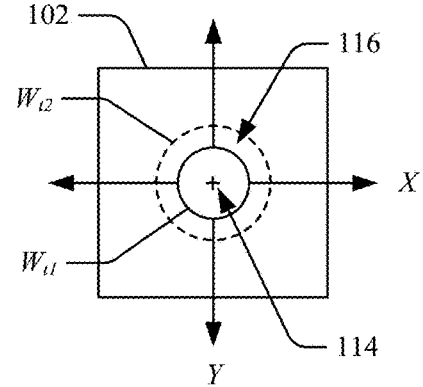

FIG. 1 illustrates an example system 100 configured to create a part with a finished surface through injection molding, including an isometric view and a bottom view of the tool 102. The system 100 includes an injection molding tool 102, a heating system 104, a cooling system 106, and a control unit 140.

The heating system 104 is operatively coupled to the injection molding tool via links 118-1 and 118-2 (collectively "links 118"). The heating system 104 may be a hot liquid heating system or some other heating system configured to heat the outer portion of the tool 102. In other examples, as shown in FIG. 1, the heating system 104 is an induction heating system. The links 118 distribute electrical current or hot liquid that is output from the heating system 104. The output form the heating system 104 produces heat at the injection molding tool 102 in areas closes to the heating coil 108.

The heating system 104 is operatively coupled to the control unit 140 via link 122-1, for example, to receive control inputs output by the control unit 140. The heating system 104 adjusts the electrical current or hot liquid being output via link 118-1. For an induction system, the heating system 104 increases the electrical current or amount of time in which the electrical current is applied to heat the injection molding tool 102 to a particular temperature that the heating system 104 derives from the control inputs. The amount of electrical current or hot liquid required to heat the injection molding tool 102 is proportional to the mass of the tool 102.

The tool 102 includes a metal 110, such as stainless steel, which is of an alloy that is selected based on its coefficient of thermal expansion. The tool 102 is formed of materials that are suitable to support injection molding of a particular type of material (e.g., resin). Some materials have lower hardening points or require more or less time to solidify. The tool 102 is formed of a metal alloy which can not only withstand the temperature fluctuations that occur during the injection molding process, but which can also realize a large amount of displacement due to thermal expansion, in a short amount of time.

The cooling system 106 is a liquid (e.g., water, oil, glycol) cooling system and is operatively coupled to the injection molding tool via links 120-1 and 120-2 (collectively "links 120"). For example, the links 120 distributes a temperature-regulated coolant, such as water, that circulates between the injection molding tool 102 and the cooling system 106. The cooling system 106 maintains the coolant at a particular temperature. The coolant dissipates heat from the injection molding tool 102 as the coolant circulates in and out of the cooling system 106 and the injection molding tool 102. The cooling system 106 prevents the inner surface temperature of the cavity 114 from becoming out of control due to rapid heating (e.g., which can increase the bulk temperature of the injection molding tool within a few seconds). The cooling system 106 regulates the cavity surface temperature. The cooling system 106 is controlled to keep the inner surface temperature of the cavity 114 to low, which prevents the material (e.g., plastic) from thermally expanding and keeps the molded part hard and solid.

The cooling system 106 is operatively coupled to the control unit 140 via link 122-2. For example, the cooling system 106 determines the desired temperature from control inputs received from the control unit 140. The cooling system 106 adjusts the coolant temperature and/or rate of circulation through the channels 120 based on the control inputs to bring the temperature of the injection molding tool 102 to the desired temperature.

The control unit 140 directs the heating system 104 and the cooling system 106 to control an injection molding process involving the injection molding tool 102. The control unit 140, or other control units or processors (not shown) may control other parts of the injection molding process. To eject a part having been shaped with the injection molding tool 102, the control unit 140 directs the heating system 104 to quickly heat an outer portion of the injection molding tool 102 above a hardening point of injection material to cause thermal expansion in the tool 102.

Optional telemetry (not shown) of the injection molding tool 102 is operatively coupled to the control unit 140 via link 122-3. The control unit 140 receives telemetry information, including information about the temperature of the injection molding tool 102 at various places within the metal 110. Other examples of telemetry information include position data about an orientation or another operating condition of the injection molding tool 102. Through control over the heating and cooling systems 104 and 106, the control unit 140 regulates the temperature of the metal 110 based on the telemetry information received via link 122-3.

The injection molding tool 102 forms a cavity 114 in which material is solidified into a molded part. An injector (not shown) injects the cavity 114 with the material while the temperature of the tool 102 is at the hardening point of the material. The material solidifies into a molded part with a wall having a finished surface and a zero or low-draft angle imparted onto the molded part by the cavity 114.

In some cases, the injection molding tool 102 interfaces with a core tool. Where the injection molding tool 102 shapes an exterior portion of the molded part, the core tool shapes an interior portion of the molded part. FIG. 1 shows the direction of draw for such a core tool. The direction of draw is perpendicular to an opening of the cavity 114, which is also congruent with a longitudinal axis Z of the injection molding tool.

The cavity 114 has sidewalls with a zero or low-draft angle, about the longitudinal axis Z. The sidewalls are perpendicular to the cavity opening and separated by a width Wt1 when the metal 110 surrounding the cavity 114 is not undergoing thermal expansion. The zero or low-draft angle of the sidewalls of the cavity 114 cause a force that prevents the molded part from releasing from the cavity 114 in the direction of draw.

The injection molding tool 102 includes a heating coil 108 integrated into the metal 110 of the injection molding tool 102 and surrounding the cavity 114. The heating coil 108 produces heat (e.g., from the electrical current or hot liquid output by the heating system 104 over link 118-1 and returned to the heating system 104 over link 118-2).

Channel 112 is integrated into the injection molding tool 102. The channel 112 is formed within an inner portion 132 of the metal 110 surrounding the cavity 114, and the heating coil 108 lies within an outer portion 130 of the metal 110. The channel 112 is operatively coupled to the cooling system 106 by links 120-1 and 120-2. The cooling system 106 circulates a liquid coolant through the channel 112 and the links 120-1 and 120-2. The channel 112 is closer to the walls of the cavity 114 than the heating coil 108, which enables greater temperature control of the walls of the cavity 114. The exact locations of the channel 112 and the heating coil 108 depend on the geometry and design of the tool 102 and the molded part and can be determined through heat transfer and thermal expansion simulations.

The cavity 114 is shown having a circular shape, although many other shapes and sizes are possible. The control unit 104 is configured to direct the heating system 104 to quickly and briefly (e.g., in less than a few seconds) heat the outer portion 130 of the injection molding tool 102 to cause thermal expansion of the metal 110 surrounding the cavity 114 effective to form an air gap 116 between the wall of a molded part and the cavity 114. The heating system 104 outputs electrical current or hot liquid to the heating coil 108 until the air gap 116 has a width Wt2, which is greater than the original width of the cavity 114 Wt1. To keep a finished surface applied to the molded part while in the cavity 114 when the air gap 116 is formed, the control unit 140 directs the cooling system 106 to keep the inner portion 132 of the injection molding tool 102 (between the cavity 114 and the outer portion 130) below the melting point of material inside the cavity 114. The air gap 116 creates an amount of separation Wt2-Wt1 between the cavity 114 and the molded part. The amount of separation required to allow the molded part to separate from the cavity 114 can depend on the texture on the surface of the cavity 114. For a smooth cavity surface, less expansion of the cavity 114, and therefore less separation may be required. A rough cavity surface exerts more grip on the molded part than a smooth cavity surface. For a rough cavity surface, more expansion of the cavity 114 may be needed before a molded part can release from the tool 102.

As the metal 110 undergoes thermal expansion, and while the air gap 116 is between the cavity 114 and the molded part, the control unit 140 controls the system 100 to eject the molded part from the cavity 114. The air gap 114 allows the molded part to break the force keeping the molded part in the cavity 114, and eject from the injection molding tool 102 with sides that have a zero or low-draft angle and a finished surface intact. Exterior walls of an injected part include a surface imparted on them from the cavity 114 during solidification; the walls solidify with a zero or low-draft angle. In this way, the molded part has a finished surface and sides with a zero or low-draft angle upon ejection from the tool, without requiring any additional finishing steps. Manufacturing injection molded parts without a need for finishing steps may decrease manufacturing time, increase yield, or decrease cost, alone or in any combination.

Figure 2:
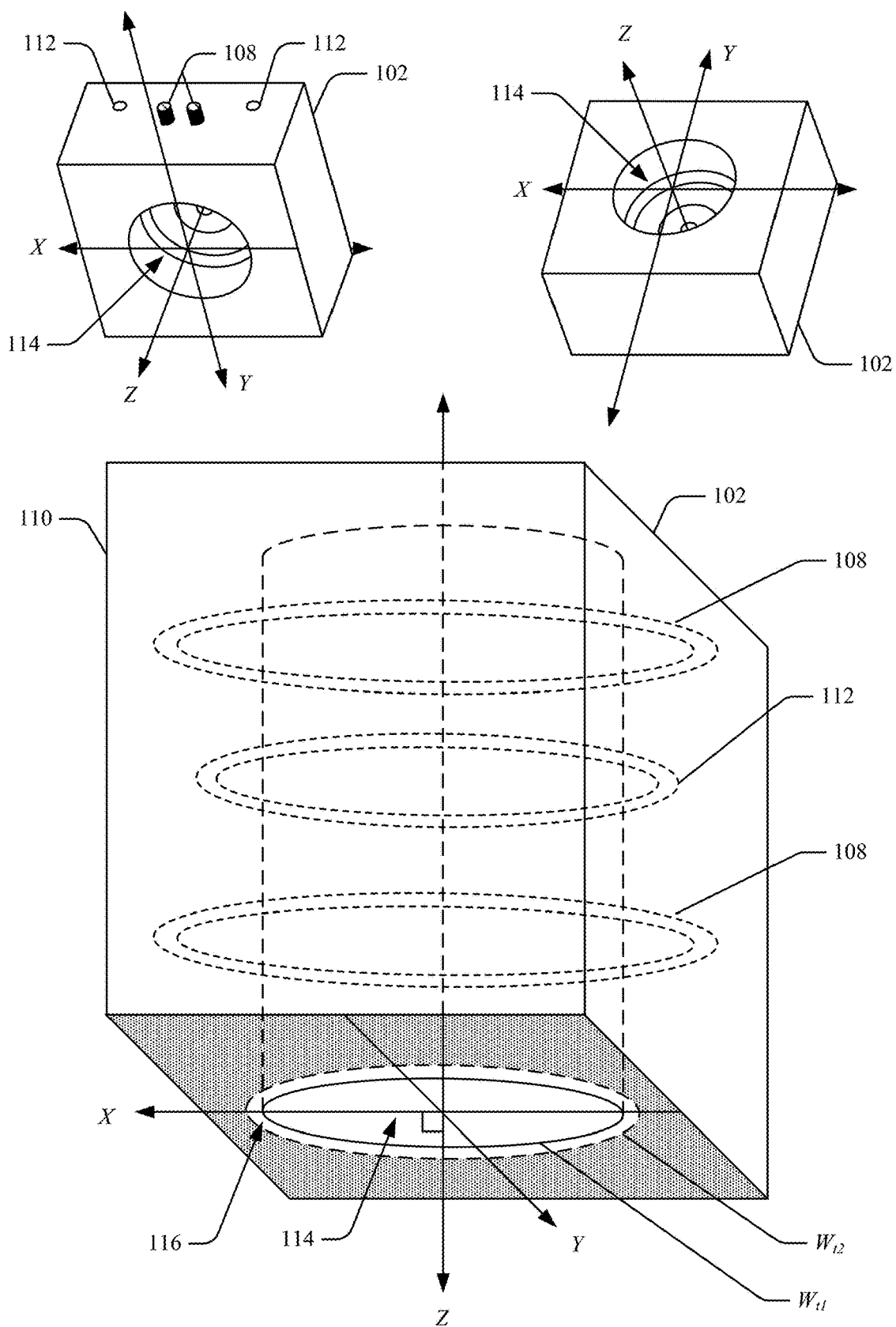
FIG. 2 illustrates multiple three-dimensional views of the tool shown in FIG. 1.

FIG. 2 illustrates multiple three-dimensional views of the tool 102 shown in FIG. 1. The heating coil 108 is shown integrated into the injection molding tool 102, contacting or nearly contacting an outer portion 130 (e.g., exterior surface) of the metal 110 that surrounds the cavity 114. Inlets to the cooling channel(s) 112 within the tool 102 are also shown. Terminal ends of the heating coil 108 are visible in the view shown in the upper left corner of FIG. 2. Terminal ends of the heating coil 108 are visible in the view shown in the upper left corner of FIG. 2.

The heating coil 108 includes two coils stacked within the outer portion 130 of the metal 110. The heating coil 108 can include more than two coils, for instance, to provide better control over the temperature of the outer portion 130 of the metal 110 or to provide temperature control over a larger area of the metal 110. In cases where the heating coil 108 is an inductive heating coil, the heating coil 108 can have an insulation layer between the metal 110 and the heating coil 108 to prevent the metal 110 from conducting the electrical current circulating through the coil 108.

The individual coils of the heating coil 108 are centered around the cavity 114 and vertically aligned with the perpendicular direction of pull (Z) from the cavity. By evenly heating the outer portion 130 of the metal 110, the cavity 114 expands from width Wt1 to width Wt2, due to thermal expansion. The thermal expansion forms the air gap 116, which enables a molded part with a finished surface, including sidewalls with zero or low-draft angles, to eject from the cavity 114 of the tool 102. Expansion times and displacement amounts vary depending on the metal 110, the injecting material (resin) and capacity for heating.

Figure 3:
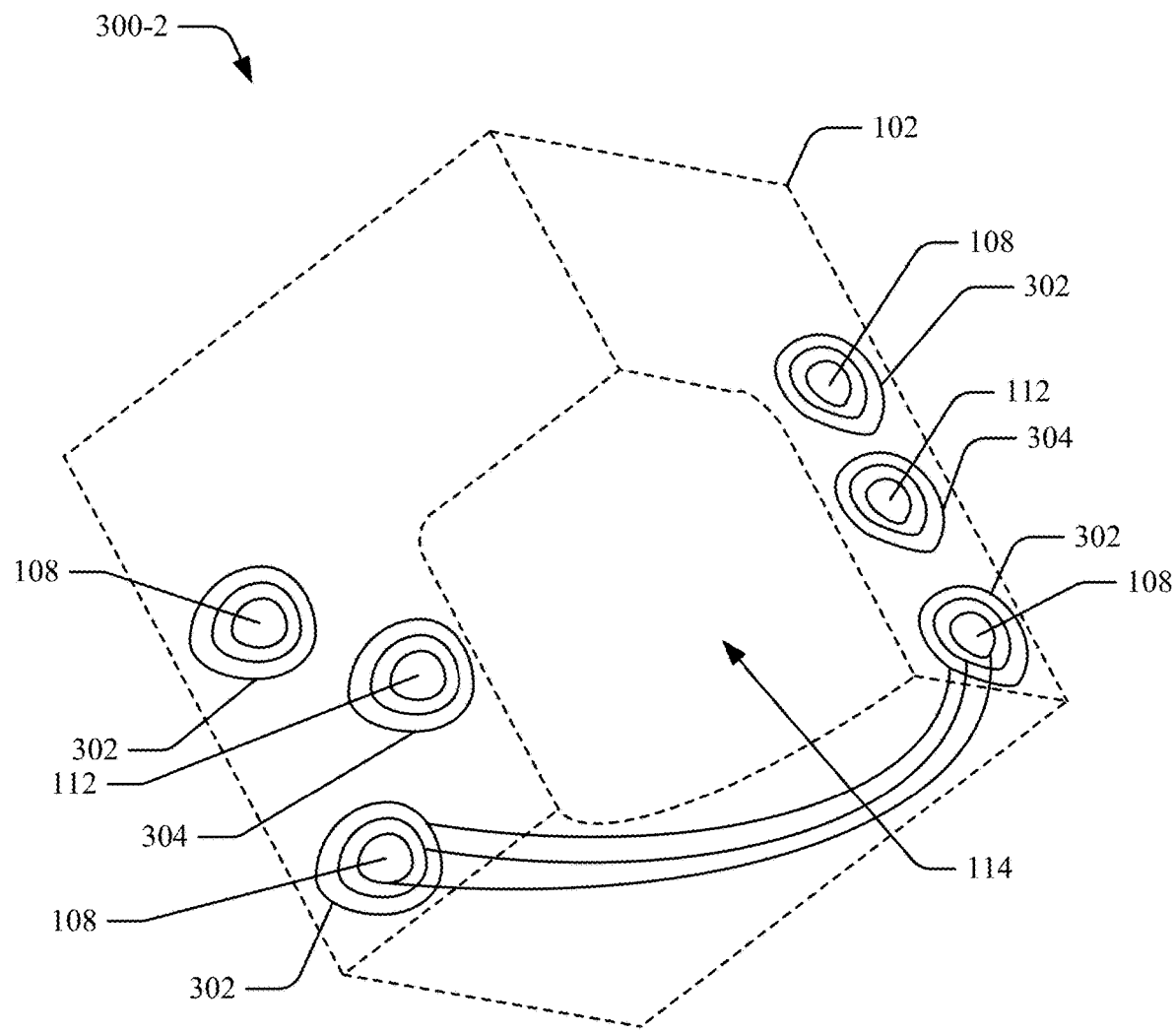
FIG. 3 illustrates thermal zones of the tool shown in FIG. 2.

FIG. 3 illustrates different thermal zones of the tool shown in FIG. 2. A quarter-sectional view 300 of the tool 102 is shown in dashed line to indicate relative positioning of the different thermal zones 302 and 304. The cooling channel 112 surrounds an inner portion of the walls of the cavity 114. Additional cooling channels may be used, for example, integrated near the top of the cavity 114, at an end opposite the opening to the cavity 114. The thermal zones 302 and 304 are located within portions of the metal 110, where the temperature of the metal 110 is regulated. The control unit 140 of the system 100 can direct the heating and cooling systems 104, 106 to heat the tool 102 and regulate the temperature of the cavity 114 for ejecting.

The thermal zones 302 are stacked vertically, surrounding the walls of the cavity 114. Each of the thermal zones 302 encompasses an outer portion of the metal 110, including the parts of the metal 110 that are nearest to the heating coil 108. The thermal zones 302 may include more than two zones, for example, to provide a more uniform heating and eventual thermal expansion of the outer portion of the metal 110. Left unregulated, the heat from the thermal zones 302 increases the temperature of the cavity 114.

The thermal zone 304 represents a temperature regulated, inner portion of the metal 110 between the cavity 114 and the outer portions of the metal 110 that is receiving the heat from the heating coil 108. The thermal zone 304 surrounds the walls of the cavity 114 to regulate the temperature of the cavity 114. Just prior to ejection, heat is applied around the tool 102 in the thermal zones 302 to cause thermal expansion.

Figure 4:
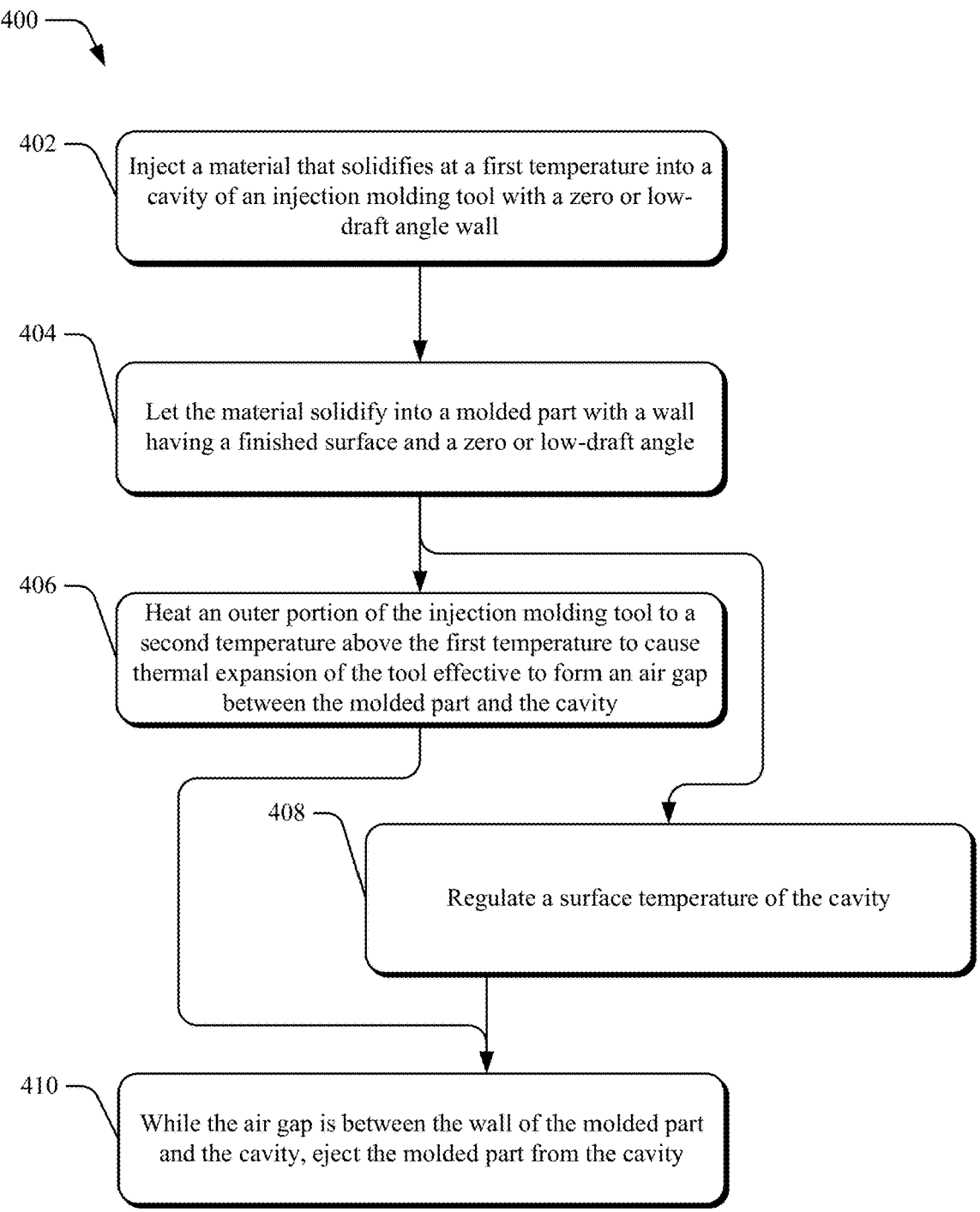
FIG. 4 illustrates an example method performed by a system configured to create a part through injection molding.

FIG. 4 illustrates an example method 400 performed by a system configured to create a part through injection molding. The method 400 is described in the context of the system 100. The operations performed in the example method 400 may be performed in a different order or with additional or fewer steps than what is shown in FIG. 4.

At 402, the system 100 inject a material that solidifies at a first temperature into a cavity of an injection molding tool having a zero or low-draft angle.

At 404, the system 100 lets the material solidify into a molded part with a wall having a finished surface and a zero or low-draft angle. As the material hardens, the walls of the cavity 114 impart a finished surface onto an exterior surface of the molded part. The exterior surface of the molded part is solidified to include a texture imprinted on the part that matches the texture on the walls of the cavity 114. The texture may be smooth, coarse, or a combination thereof.

At 406 and 408, after the molded part solidifies, the system 100 simultaneously heats and cools different portions of the tool 102 (e.g., outer and inner portions 130 and 132), which results in an air gap being created. The air gap allows the part to release from the cavity 114.

At 406, the system 100 quickly and briefly heats outer portion 130 of the injection molding tool to a temperature that causes thermal expansion of the tool 102, effective to form an air gap between the molded part and the cavity. For example, the control unit 140 directs the heating system 104 to output electrical current or hot liquid to the heating coil 108 to rapidly heat the outer portion of the injection molding tool 102 sufficient to cause thermal expansion in the tool 102. Quickly heating the injection molding tool 102 at step 406 occurs briefly, for example, in under a few seconds. The brief, intense heating induces thermal expansion of the metal 110 surrounding the cavity 114, which is effective to form an air gap 116 between the wall of the molded part and the cavity 114, for enough time to eject the molded part without damaging the tool 102 or the molded part.

During this brief moment when the injection molding tool 102 undergoes thermal expansion, at 408 the system 100 regulates a surface temperature of the cavity, e.g., by simultaneously cooling an inner portion of the injection molding tool 102 between the cavity and the outer portion. The cooling keeps the molded part at or below the hardening temperature when the air gap is formed. For example, the control unit 140 directs the cooling system 106 to circulate coolant within the channel 112 to cool the thermal zone 304 and regulate the surface temperature of the cavity 114. The cooling system 104 cools the thermal zone 304 located in the inner portion of the metal 110, to or below the hardening temperature of the material keep the molded part solidified within the cavity 114.

At 410, while the air gap is formed between the wall of the molded part and the cavity, the system 100 ejects the molded part from the cavity with at least one exterior wall having a finished surface and a zero or low-draft angle. As explained, the air gap 116 allows the molded part to overcome the force caused by zero or low-draft angle sides in the tool 102, which might prevent the molded part from releasing from the cavity 114. This way, the air gap 116 allows separation from the cavity 114 without melting or softening the finished surface of the solidified part.

Figures 1, 5:
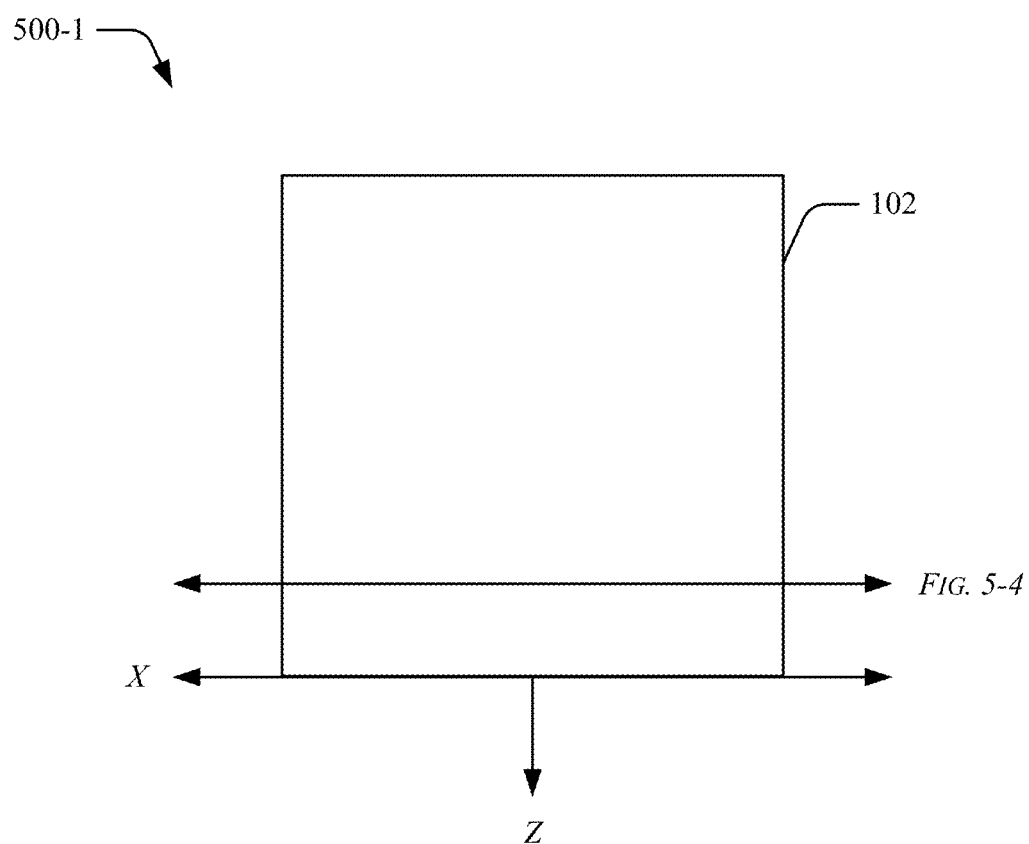
Figures 2, 5:
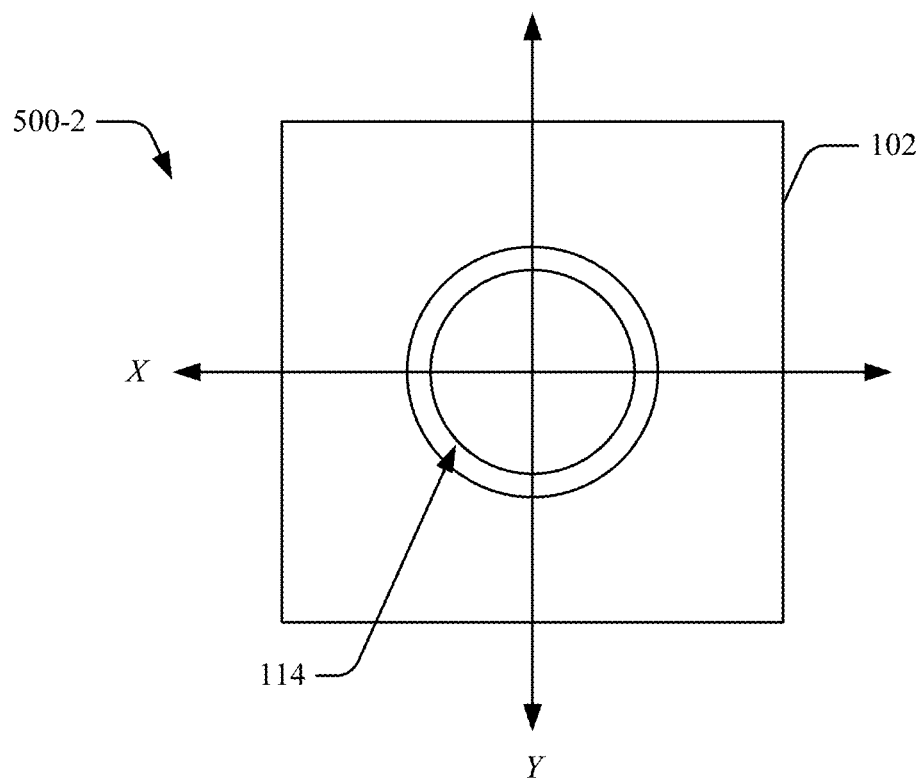
Figures 3, 5:
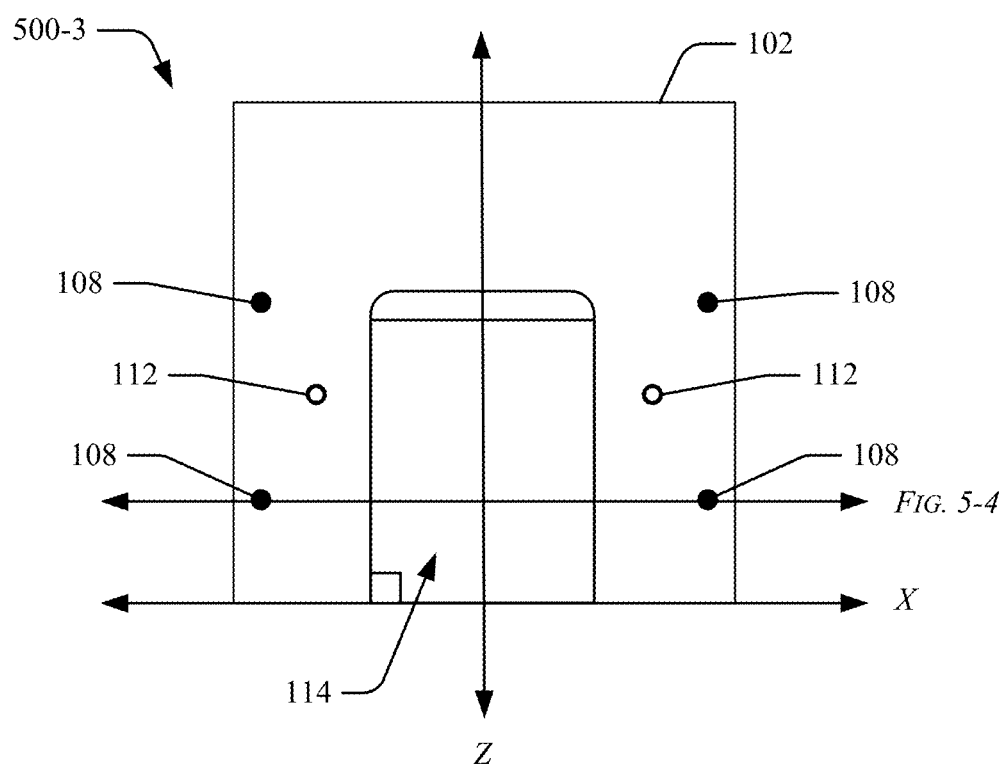
Figures 4, 5:
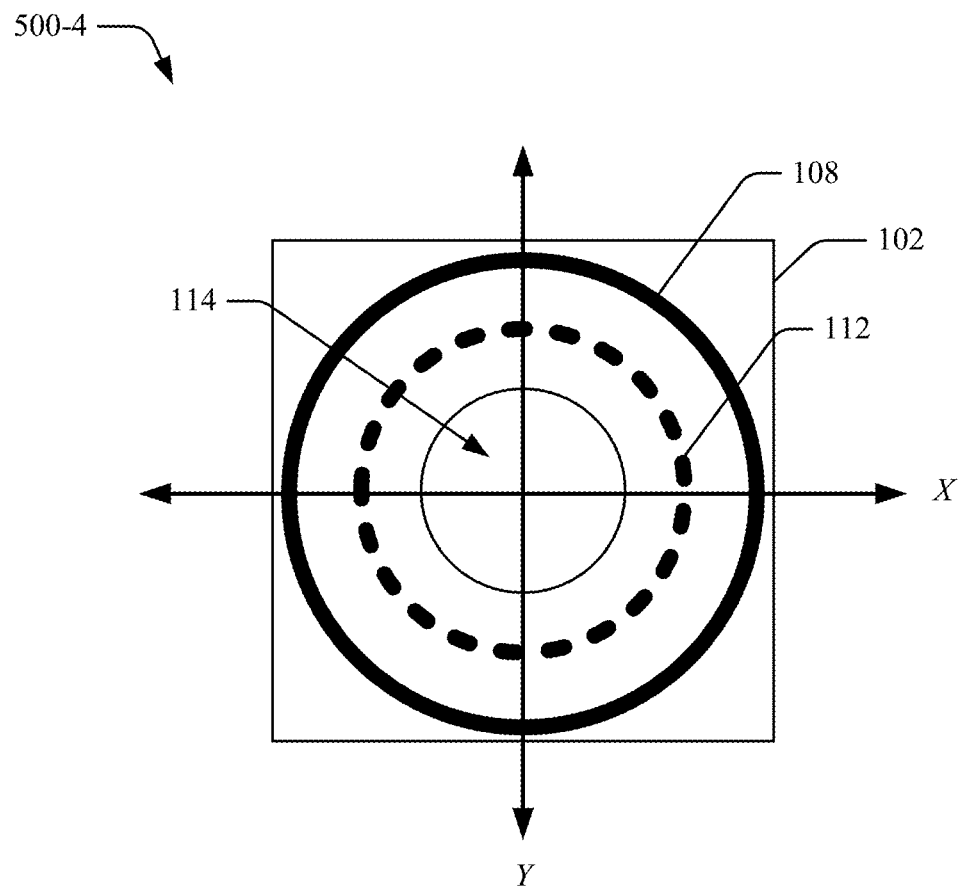

FIG. 5-1 illustrates an exterior side view 500-1 of the tool shown in FIG. 2. The tool 102 includes the heating coil 108 integrated within the tool 102. The heating coil 108 wraps around the exterior surface of the tool 102 or is integrated within the metal of the tool 102. The heating coil 108 may be surrounded by the metal of the tool 102. As shown, the heating coil 108 is partially surrounded by the metal of the tool 102, within a cutout that surrounds the cavity 114 of the tool 102.

FIG. 5-2 illustrates a bottom view 500-2 of the tool shown in FIG. 2. An opening to the cavity 114 is circular. Other cavity shapes are possible, including rectangular openings.

FIG. 5-3 illustrates a cross-sectional side view 500-3 of the tool 102 shown in FIG. 2. In the view 500-3, the tool 102 includes the heating coil 108 wrapped around the tool a further distance from the cavity 114 than the cooling channel 112.

FIG. 5-4 illustrates a cross-sectional bottom view 500-4 of the tool 120 shown in FIG. 2. The channel 112 is shown as a dashed lines because the channel is contained within the metal 110 surrounding the cavity 114 and therefore not visible from the cross-sectional bottom view 500-4. The exact positioning of the channel 112 depends on size of the cavity 114 and the mass and geometry of the tool 102. FIG. 5-4 illustrates positioning of the heating coil 108 relative to the channel 112, within the metal 110 of the injection molding tool 102. The channel 112 is contained within an inner portion of the injection molding tool 102 and surrounds an opening to the cavity 114. The heating coil 108 is positioned adjacent to or within an outer portion of the injection molding tool 102. Therefore, the heating coil 108 is further from the cavity 114 than the inner portion which contains the channel 112. By heating the outer portion of the injection molding tool 102, the metal 110 expands the cavity 114 by pulling the walls of the cavity 114 apart. Simultaneously cooling the inner portion of the injection molding tool 102, which is located between the outer portion of the tool 102 and the cavity 114, protects material that has solidified within the cavity 114 from the heat causing the thermal expansion of the tool 102.

Figures 1, 6:
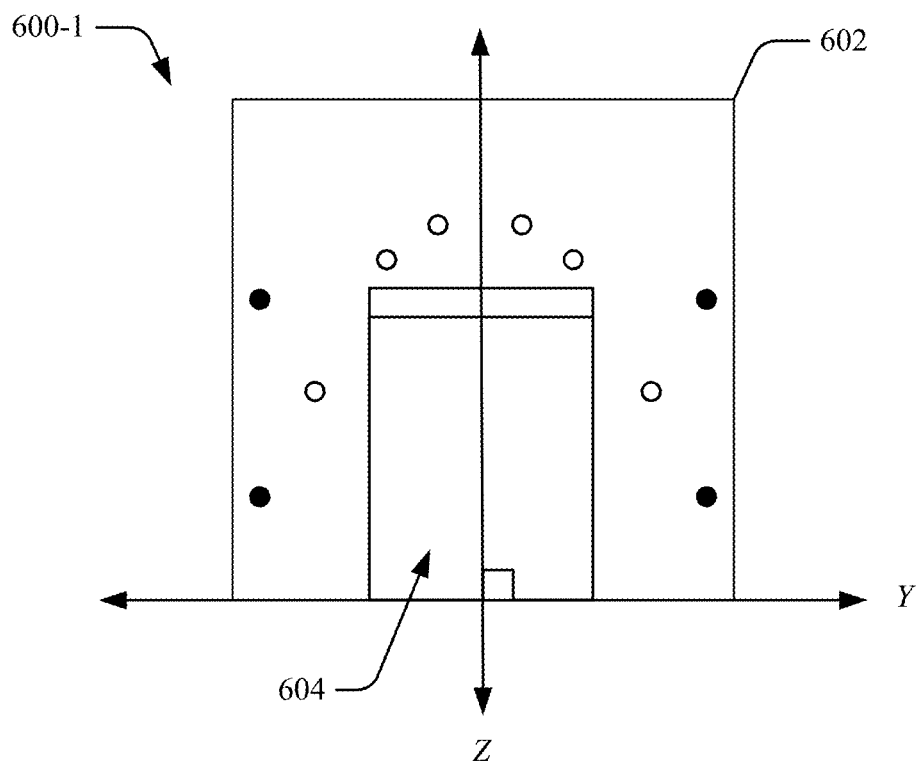
Figures 2, 6:
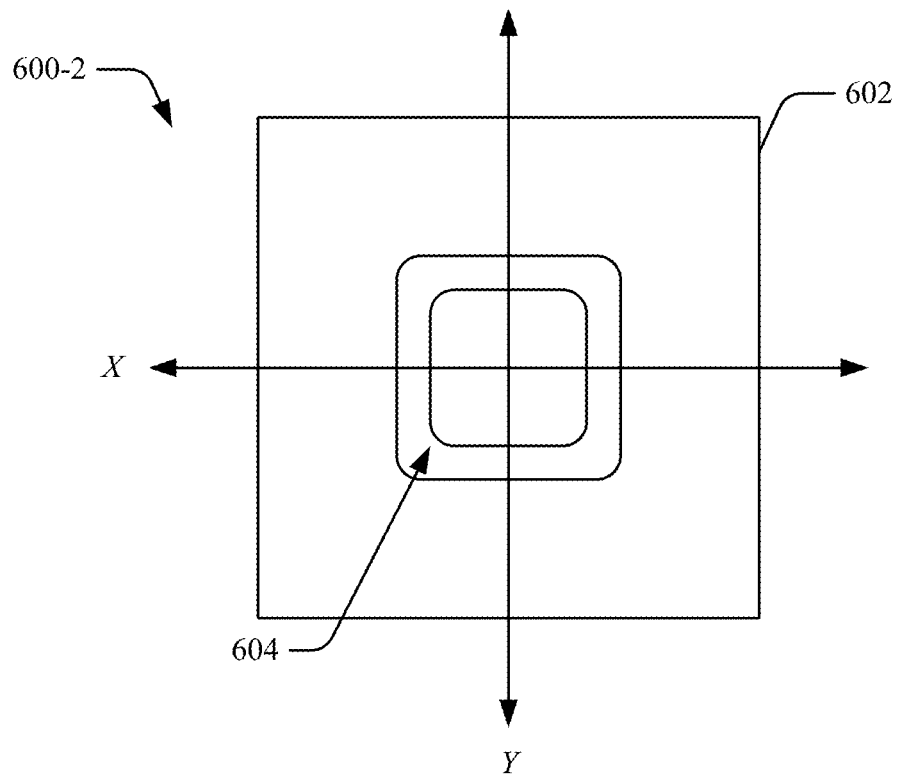

FIG. 6-1 illustrates a cross-sectional side view 600-1 of another tool configured to create a part through injection molding. An injection molding tool 602 is an example of the injection molding tool 102, but with a cavity 604 that is of a different shape than the cavity 114. Rather than rounded corners, the cavity 604 includes sidewalls with zero or low-draft angles and sharp, perpendicular corners where the sidewalls meet the bottom of the cavity 604, at an end of the cavity 604 opposite an opening of the cavity 604.

FIG. 6-2 illustrates a bottom view 600-2 of the other tool shown in FIG. 6-1. An opening to the cavity 604 is rectangular. The cavity 604 can take many other shapes and forms.

Figures 1, 7:
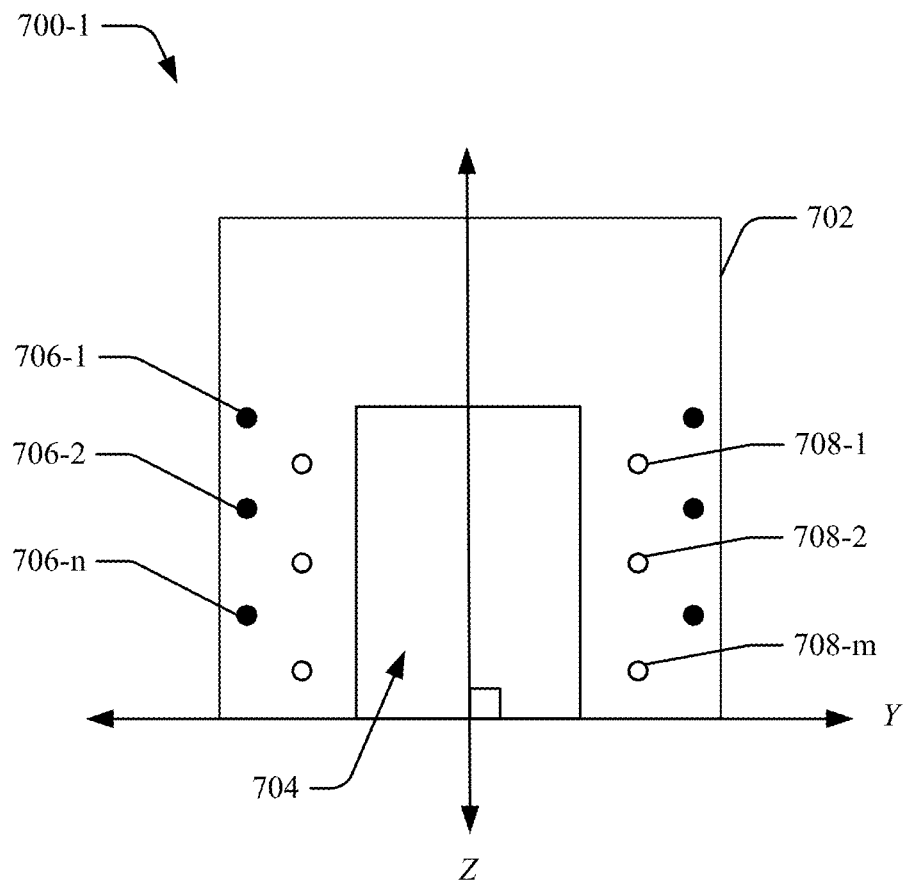
Figures 2, 7:
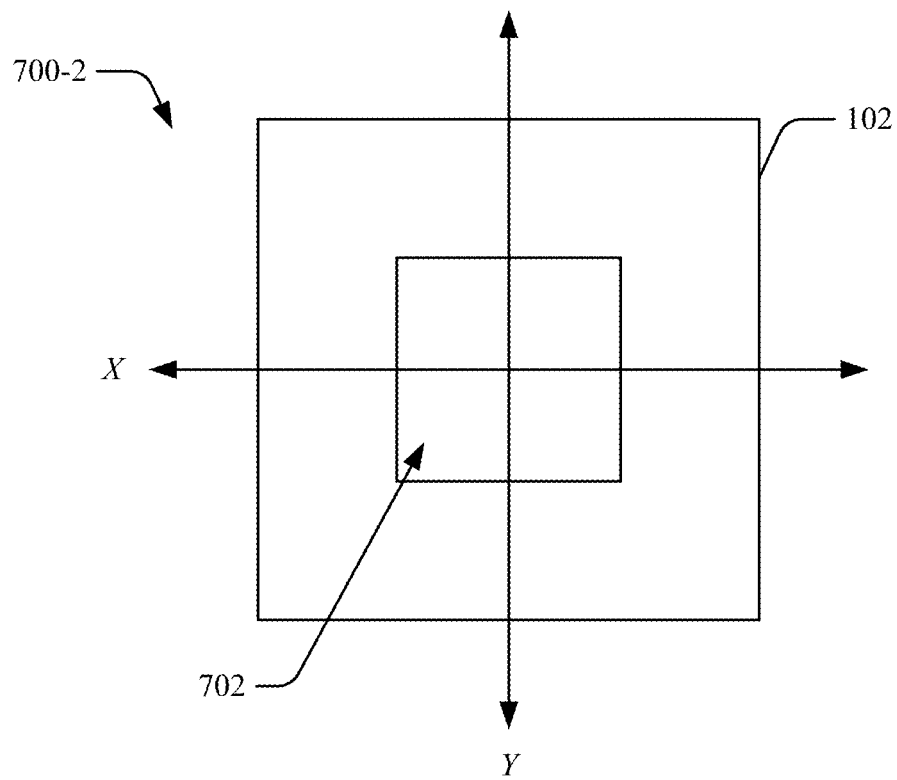

FIG. 7-1 illustrates a cross-sectional side view 700-1 of an additional tool configured to create a part with a finished surface through injection molding. FIG. 7-2 illustrates a bottom view 700-2 of the additional tool shown in FIG. 7-1.

An injection molding tool 702 is an example of the injection molding tool 102, but with additional cooling channels and heating coils. The injection molding tool 702 includes a cavity 704 surrounded by a plurality of heating coils 706-1 through 706-n (collectively "heating coils 706). An opening to the cavity 704 is square. However, the cavity 704 can take many other shapes and forms including a circular or elliptical form. The heating coils 706 are an example of the heating coil 108. The heating coils 706 are stacked vertically with the direction of draw from the cavity 704 to provide even heating to the sidewalls of the cavity 704. The cavity 704 is further surrounded by a plurality of cooling channels 708-1 through 708-m (collectively "cooling channels 708"). The cooling channels 708 are examples of the cooling channel 112 and configured to circulate liquid coolant around the cavity 704. Having more than one cooling channel 708 and/or more than two heating coils 706 allows greater control over the temperature of the injection molding tool 102, which may further aid in molding complex parts with finished sides, which have a zero or low-draft angle.

Figure 8:
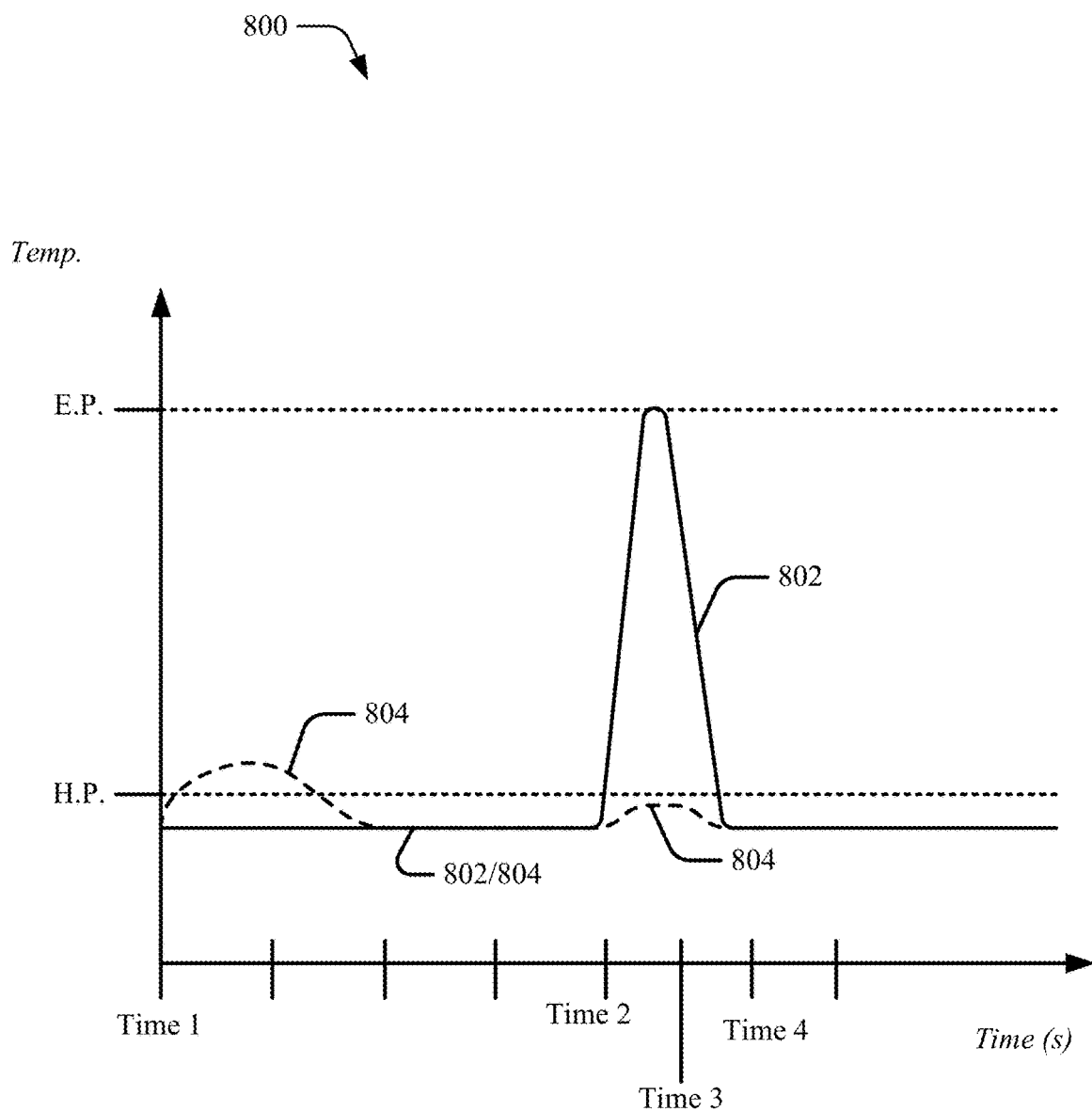
FIG. 8 illustrates a temperature graph of an example system configured to create a part through injection molding.

FIG. 8 illustrates a temperature graph 800 of an example system configured to create a part with a finished surface through injection molding. The temperature graph 800 is described in the context of system 100 and is meant as an example process. Temperatures and timings associated with the described techniques vary depending on the type of material and the coefficient of thermal expansion associated with the metal tool being used. For this example, the injection material is a polycarbonate but other injection materials may be used in other implementations.

The temperature graph 800 includes a temperature reading 802 of an outer portion of the tool 102 throughout the injection molding process. For example, the temperature reading 802 corresponds to a temperature taken within one of the thermal zones 302 from FIG. 3. The temperature graph 800 further includes a temperature reading 804 of a surface on the inside of the cavity 114 of the tool 102 (also referred to as the surface temperature of the cavity 114). The temperature reading 804 approximates the temperature of the molded part.

The hardening point (H.P. in FIG. 8) depends on the molded material, this is the temperature that the material changes to a solid body. The surface temperature of the cavity (the temperature reading 804) cannot exceed the hardening point without liquifying or softening the material. Therefore, the surface temperature 804 of the cavity 114 cannot exceed the hardening point and kept within a range of eighty to one hundred thirty-five degrees Celsius, plus or minus ten degrees depending on different types of polycarbonate materials used.

Both 804 and 802 start from the same temperature at time 1, and the system injects material into the cavity 114. The material solidifies at the hardening point, which, for polycarbonate may be 100 degrees Celsius or a range between ninety to one hundred twenty degrees Celsius. The injecting material can rise above and fall below the hardening point upon injection. At time 2, the temperature 804 in cavity surface rapidly goes high with the increase in the temperature 802 of the tool.

However, almost immediately when the induction heater goes on, both 802 and 804 temperatures increase, but the temperature in 804 does not go higher than the hardening point because the cooling system that is located between the induction heater and the cavity surface is regulating the surface temperature of the cavity 114. Thermocouple(s) that reads the temperature and sends the feedback to the controller can be installed near the cavity surface (right underneath of the cavity surface). This point is critical and important to be measured. The controller changes the current and time the induction heater is on based on the surface temperature 804 of the cavity 114.

Once the molded part is solid, at time 2, the system 100 quickly and briefly (e.g., in less than one or in under a few seconds) heats the outer portion of the tool 102 to a temperature that causes sufficient thermal expansion, referred herein as an expansion point (E.P.) of the cavity 114. The thermal expansion produces an air gap 116 that allows the molded part to release from the cavity 114. During this expansion, however, the surface temperature of the cavity 804 could be just below the hardening point of the material during ejection at time 3. Between times 2 and 3, the temperature reading 802 increases greatly from the hardening point and reaches the temperature for thermal expansion. Between times three and four, the outer portion of the tool 102 cools.

Even though the temperature reading 802 increased, the temperature reading 804 of the surface of the cavity 114 remains below the hardening temperature because of the cooling simultaneously being applied between the heat source and the cavity 114. For polycarbonate, the cooling may be around seventy degrees Celsius if the outer portion of the tool is heated between ninety to one hundred twenty degrees Celsius. In this way, the molded part within the cavity 114 has a finished surface and sides with a zero or low-draft angle that remain intact after being ejected.

The following are additional examples of systems and techniques for achieving a finished surface through injection molding:

Example 1. A method comprising: injecting a material that solidifies at a first temperature into a cavity of an injection molding tool with a zero or low-draft angle wall; expanding the cavity of the injection molding tool by heating an outer portion of the injection molding tool above the first temperature while cooling an inner portion of the injection molding tool that is between the cavity and the outer portion of the injection molding tool to regulate a surface temperature of the cavity; and ejecting, from the cavity, the molded part.

Example 2. The method of example 1, further comprising: regulating, with a heating system or a cooling system, the surface temperature of the cavity of the injection molding tool.

Example 3. The method of example 2, wherein the heating system or the cooling system is a fluid system and the injection molding tool includes a fluid channel integrated into the injection molding tool and surrounding the cavity.

Example 4. The method of example 2, wherein the heating system is an induction heating system and the injection molding tool includes an induction coil integrated into the injection molding tool and surrounding the cavity.

Example 5. The method of example 4, wherein the induction coil includes a plurality of coils stacked within the outer portion and vertically aligned with a direction of pull from the cavity.

Example 6. The method of any of examples 2 through 5, wherein cooling an inner portion of the injection molding tool that is between the cavity and the outer portion of the injection molding tool includes: cooling, with the cooling system, the inner portion of the injection molding tool to regulate the surface temperature of the cavity.

Example 7. The method of example 6, wherein the cooling system is a liquid cooling system and the inner portion of the injection molding tool includes a channel surrounding the cavity and configured to circulate liquid coolant received from the cooling system.

Example 8. The method of any of examples 1 through 7, wherein the inner portion of the injection molding tool surrounds an opening to the cavity, and the outer portion of the injection molding tool surrounds the inner portion.

Example 9. The method of any of examples 1 through 8, further comprising cooling a portion of the injection molding tool that is opposite an opening to the cavity.

Example 10. The method of any of examples 1 through 9, wherein the injection molding tool is formed of a metal alloy with a coefficient of thermal expansion sufficient to form an air gap between the material and the cavity.

Example 11. The method of example 10, wherein the metal alloy includes stainless steel.

Example 12. A system comprising means to perform any one of the methods of examples 1 through 11.

Example 13. A computer-readable storage medium comprising instructions that, when executed, cause at least one processor of a control unit to direct a system to perform any one of the methods of examples 1 through 11.

Example 14. An injection molding tool comprising: a cavity having a zero or low-draft angle wall and configured to contain an injection of a material that solidifies at a first temperature; an outer portion comprising one or more heating channels surrounding the zero or low-draft angle wall of the cavity, the one or more heating channels being arranged in the outer portion to allow for uniform expansion in size of the cavity when the outer portion is heated above the first temperature either from a heating fluid circulating through the one or more heating channels or from one or more electrical heating coils at least partially contained in the one or more heating channels; and an inner portion comprising one or more cooling channels surrounding the zero or low-draft angle wall of the cavity and positioned between the zero or low-draft angle wall of the cavity and the outer portion, the one or more cooling channels being configured to circulate a cooling fluid and arranged in the outer portion to allow for uniform cooling of the zero or low-draft angle wall of the cavity to regulate a surface temperature of the zero or low-draft angle wall of the cavity when the outer portion is heated to expand the size of cavity.

Example 15. The injection molding tool of the example 14, wherein the one or more heating channels are stacked within the outer portion, the one or more cooling channels are stacked within the inner portion, and the one or more heating channels and the one or more cooling channels are vertically aligned with a direction of pull from the cavity.

Example 16. The injection molding tool of the example 14, wherein the inner portion surrounds an opening to the cavity and the outer portion of the injection molding tool surrounds the inner portion.

Example 17. The injection molding tool of the example 16, further comprising: one or more additional cooling channels positioned beneath the cavity opposite the opening and configured to circulate additional cooling fluid before injection of the material, during the injection of the material into the cavity, or after the material is ejected from the cavity.

Example 18. The injection molding tool of the example 14, wherein the injection molding tool is formed of a metal alloy with a coefficient of thermal expansion sufficient to form an air gap between the material and the cavity.

Example 19. A system comprising means configured to perform any one of the methods of examples 1 through 11, wherein the means include the injection molding tool of any of the examples 14 through 18.

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

What is claimed:

1. A method comprising:
   injecting a material that solidifies at a first temperature into a cavity of an injection molding tool with at least one of a zero angle wall or a low-draft angle wall; and
   expanding the cavity of the injection molding tool by heating a first portion of the injection molding tool above the first temperature to form an air gap between the material and the cavity while cooling a second portion of the injection molding tool that is between the cavity and the first portion of the injection molding tool to regulate a surface temperature of the cavity lower than the first temperature.

2. The method of claim 1, further comprising:
   ejecting, from the cavity, a molded part.

3. The method of claim 2, wherein the second portion of the injection molding tool surrounds an opening to the cavity, and wherein the first portion of the injection molding tool surrounds the second portion.

4. The molded part produced by the method of claim 2.

5. The method of claim 1, further comprising:
   regulating, with at least one of a heating system or a cooling system, the surface temperature of the cavity.

6. The method of claim 5, wherein the heating system or the cooling system is a fluid system, and wherein the injection molding tool includes a fluid channel integrated into the injection molding tool and surrounding the cavity.

7. The method of claim 6, wherein cooling the second portion of the injection molding tool that is between the cavity and the first portion of the injection molding tool includes:
   cooling, with the cooling system, the second portion of the injection molding tool to regulate the surface temperature of the cavity.

8. The method of claim 6, wherein the injection molding tool is formed of a metal alloy with a coefficient of thermal expansion sufficient to form the air gap between the material and the cavity.

9. The method of claim 5, wherein the heating system is an induction heating system, and wherein the injection molding tool includes an induction coil integrated into the injection molding tool and surrounding the cavity.

10. The method of claim 9, wherein the induction coil includes a plurality of coils stacked within the first portion and vertically aligned with a direction of pull from the cavity.

11. The method of claim 10, wherein the second portion of the injection molding tool surrounds an opening to the cavity, and wherein the first portion of the injection molding tool surrounds the second portion.

12. The method of claim 10, wherein the injection molding tool is formed of a metal alloy with a coefficient of thermal expansion sufficient to form the air gap between the material and the cavity.

13. The method of claim 5, wherein cooling the second portion of the injection molding tool that is between the cavity and the first portion of the injection molding tool includes:
   cooling, with the cooling system, the second portion of the injection molding tool to regulate the surface temperature of the cavity.

14. The method of claim 13, wherein the cooling system is a liquid cooling system, and wherein the second portion of the injection molding tool includes a channel surrounding the cavity and configured to circulate liquid coolant received from the cooling system.

15. The method of claim 13, wherein the second portion of the injection molding tool surrounds an opening to the cavity, and wherein the first portion of the injection molding tool surrounds the second portion.

16. The method of claim 13, wherein the injection molding tool is formed of a metal alloy with a coefficient of thermal expansion sufficient to form the air gap between the material and the cavity.

17. The method of claim 1, wherein the second portion of the injection molding tool surrounds an opening to the cavity, and the first portion of the injection molding tool surrounds the second portion.

18. The method of claim 1, wherein the injection molding tool is formed of a metal alloy with a coefficient of thermal expansion sufficient to form the air gap between the material and the cavity.

19. The method of claim 1, wherein the first portion is an outer portion of the injection molding tool, and wherein the second portion is an inner portion of the injection molding tool.

20. The method of claim 1, wherein the first portion is spaced apart from the cavity, and wherein the second portion is proximal to the cavity.

* * * * *